(12) United States Patent
Peng et al.

(10) Patent No.: US 8,576,913 B2
(45) Date of Patent: Nov. 5, 2013

(54) FRAME PREDICTION SYSTEM AND PREDICTION METHOD THEREOF

(75) Inventors: Wen-Hsiao Peng, Hsinchu County (TW); Yi-Wen Chen, Taichung (TW)

(73) Assignee: National Chiao Tung University, Hsinchu (TW)

( * ) Notice: Subject to any disclaimer, the term of this patent is extended or adjusted under 35 U.S.C. 154(b) by 507 days.

(21) Appl. No.: 13/019,054

(22) Filed: Feb. 1, 2011

(65) Prior Publication Data

US 2012/0183069 A1 Jul. 19, 2012

(30) Foreign Application Priority Data

Jan. 18, 2011 (TW) .............................. 100101870 A

(51) Int. Cl.
*H04N 11/02* (2006.01)
(52) U.S. Cl.
USPC .............. 375/240.16; 348/699; 375/240.12; 382/100; 382/107; 382/261
(58) Field of Classification Search
USPC .................... 348/699; 375/240; 382/100–261
See application file for complete search history.

(56) References Cited

U.S. PATENT DOCUMENTS

| | | | |
|---|---|---|---|
| 6,195,467 B1 * | 2/2001 | Asimopoulos et al. | 382/261 |
| 6,452,971 B1 * | 9/2002 | Iwasaki et al. | 375/240.12 |
| 7,447,337 B2 * | 11/2008 | Zhang et al. | 382/107 |
| 8,320,458 B2 * | 11/2012 | Sato | 375/240.16 |
| 2004/0247154 A1 * | 12/2004 | Bodo et al. | 382/100 |
| 2006/0285596 A1 * | 12/2006 | Kondo et al. | 375/240.16 |

* cited by examiner

*Primary Examiner* — Tung Vo
*Assistant Examiner* — Luis M Perez
(74) *Attorney, Agent, or Firm* — WPAT, P.C.; Anthony King

(57) ABSTRACT

A frame prediction system and a prediction method thereof. An initializing module initializes a first image block having a plurality of pixels. A providing module provides a first centroid and a first motion vector of a second image block. The location lookup module finds a location according to the first centroid, and generates a first weight and a second weight respectively according to a relationship between each of the pixels, the first centroid and the location. A vector lookup module finds a second motion vector, which gives a minimum pixel intensity error for the plurality of pixels in the first image block according to the first centroid, the first motion vector, the location, the first weight and the second weight. A processing module sequentially calculates a plurality of predictive intensity values according to the motion vectors and the weights.

18 Claims, 4 Drawing Sheets

FRAME PREDICTION SYSTEM AND PREDICTION METHOD THEREOF

BACKGROUND OF THE INVENTION

1. Field of the Invention

The present invention relates to a frame prediction system and a prediction method thereof, and more particularly to a frame prediction system and a prediction method thereof capable of saving the transmitting bit and improving the frame prediction efficiency.

2. Description of Related Art

Conventional overlapped block motion compensation (OBMC) uses linear minimum mean square error (LMMSE) to calculate the weight of each motion vector compensated predictor and multiply all predicted values with the best predicted value of each weight. Conventional overlapped block motion compensation primarily uses a motion prediction in a constant block size.

However, in the motion prediction of irregular block sizes, the linear minimum mean square error produced by the conventional overlapped block motion compensation will generate many weight parameters, and too-many weight parameters will give rise to an additional requirement for memory and storage space. In the meantime, the motion prediction of irregular block sizes will generate many geometric relations among the different sized block sizes, and each geometric relation requires using the linear minimum mean square error to find the best weight, and thus the under-determined problem may occur easily.

As to the aforementioned requirement, designing a feasible frame prediction system and a frame prediction method to save the transmitting bits to improve the frame prediction efficiency demands immediate attentions and feasible solutions.

SUMMARY OF THE INVENTION

In view of the shortcomings of the prior art, it is a primary objective of the present invention to provide a frame prediction system and a prediction method thereof to overcome the problems of a low transmission efficiency and a poor prediction efficiency of image frames.

To achieve the foregoing objective, the present invention provides a frame prediction system, comprising an initializing module, a providing module, a location lookup module, a vector lookup module and a processing module. The initializing module is provided for initializing a first image block, and the first image block includes a plurality of pixels, and the providing module provides a first centroid and a first motion vector of a second image block. The location lookup module is coupled to the initializing module and the providing module for finding a location according to the first centroid, and the location lookup module generates a first weight and a second weight according to the relation between each of the pixels with the first centroid and the location respectively, such that the plurality of pixels has a first minimum pixel intensity error in the first image block. The vector lookup module is coupled to the providing module and the location lookup module for finding a second motion vector which gives a second minimum pixel intensity error to the plurality of pixels in the first image block according to the first centroid, the first motion vector, the location, the first weight and the second weight. The processing module is coupled to the providing module, the location lookup module and the vector lookup module for sequentially calculating a predictive intensity value of each of the pixels according to the first motion vector, the second motion vector, the first weight and the second weight.

To achieve the objective of the present invention, the invention further provides a frame prediction method comprising the steps of: initializing a first image block, wherein the first image block includes a plurality of pixels; providing a first centroid and a first motion vector of a second image block; finding a location according to the first centroid; generating a first weight and a second weight according to each of the pixels with the first centroid and the location, such that the plurality of pixels has a first minimum pixel intensity error in the first image block; according to the first centroid, the first motion vector, the location, the first weight and the second weight; and the plurality of pixels having a second motion vector of a second minimum pixel intensity error in the first image block according to the first motion vector, the second motion vector, the first weight and the second weight for sequentially calculating of a predictive intensity value each of the pixels.

Wherein, the processing module linearly combines the first motion vector, the second motion vector, the first weight and the second weight to calculate of the predictive intensity value of each of the pixels.

Wherein, the location lookup module generates corresponding first weight and second weight inversely proportional to the square of the distance between any pixel and the first centroid, and inversely proportional to the square of the distance between the pixel and the location.

Wherein, the providing module further provides a second centroid and a third motion vector of a third image block.

Wherein, the location lookup module finds the location according to the first centroid and the second centroid, and the location lookup module generates the corresponding first weight, second weight and third weight according to the relation of each of the pixels with the first centroid, the second centroid and the location, such that the plurality of pixels have the first minimum pixel intensity error in the first image block.

Wherein, the vector lookup module finds the second motion vector which gives the second minimum pixel intensity error to the plurality of pixels in the first image block according to the first centroid, the second centroid, the first motion vector, the third motion vector, the location, the first weight, the second weight and the third weight.

Wherein, the processing module sequentially calculating the predictive intensity value of each of the pixels according to the first motion vector, the third motion vector, the second motion vector, the first weight, the second weight and the third weight.

Wherein, the providing module further provides a fourth motion vector of the third image block.

Wherein, the vector lookup module finds the second motion vector which gives the second minimum pixel intensity error to the plurality of pixels in the first image block according to the first centroid, the second centroid, the first motion vector, the third motion vector, the fourth motion vector, the location, the first weight, the second weight and the third weight.

Wherein, the processing module sequentially calculates the predictive intensity value of each of the pixels according to the first motion vector, the third motion vector, the fourth motion vector, the second motion vector, the first weight, the second weight and the third weight.

Wherein, the processing module calculates the predictive intensity value of each of the pixels by a parametric overlapped block motion compensation (POBMC) method.

In summation, the frame prediction system and the prediction method of the present invention have the following advantages:

The frame prediction system and prediction method can use the predicted value produced by combining the template matching and the conventional block matching to obtain the efficiency equal to the multi-hypothesis, but it just requires the bits for transmitting the motion vector produced by the conventional block matching, and the prediction method can set the matching criterion used for the block matching again to obtain a better prediction effect.

DETAILED DESCRIPTION OF THE PREFERRED EMBODIMENTS

While the frame prediction system and frame prediction method of the present invention are described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures. Where used in the various figures of the drawings, the same numerals designate the same or similar parts.

Figure 1:
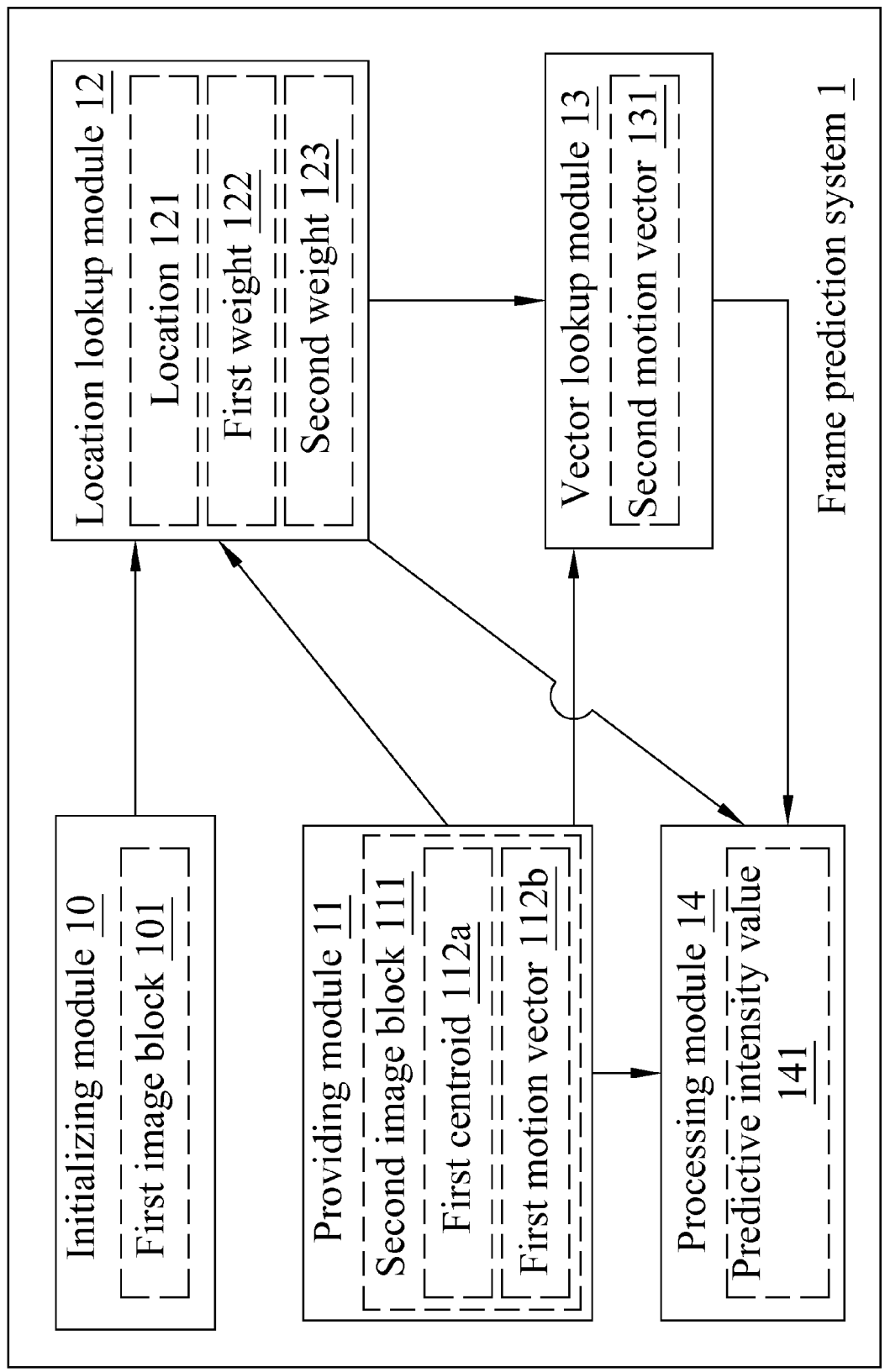
FIG. 1 is a block diagram of a frame prediction system in accordance with a preferred embodiment of the present invention.

With reference to FIG. 1 for a block diagram of a frame prediction system in accordance with a preferred embodiment of the present invention, the frame prediction system 1 comprises an initializing module 10, a providing module 11, a location lookup module 12, a vector lookup module 13 and a processing module 14. The initializing module 10 is provided for initializing a first image block 101, wherein the first image block 101 is in a square or rectangular shape having a plurality of pixels. The providing module 11 provides a first centroid 112a and a first motion vector 112b of a second image block 111. The location lookup module 12 is coupled to the initializing module 10 and the providing module 11 for finding a location 121 having the minimum pixel intensity error of the plurality of pixels in the first image block 101 according to the first centroid 112a of the second image block 111. The location lookup module 12 generates a first weight 122 and a second weight 123 according to a relation of each of the pixels with the first centroid 112a and the location 121, such that the plurality of pixels have the theoretical value of a first minimum pixel intensive error in the first image block 101, and the following condition is satisfied:

$$s_b^* = \mathrm{argmin}_b \sum_{s \in B} (\varepsilon (1 - w_b(s, b, s_t))^2 r^2(s, s_t) + \varepsilon w_b(s, b, s_t)^2 r^2(s, b))$$

Wherein, B is the block motion compensation prediction portion 101; $w_b(s,s_1,s_2) = r^2(s,s_2)/(r^2(s,s_1)+r^2(s,s_2))$ is the weight of a corresponding point $s_1$ of the pixel s after points $s_1$ and $s_2$ are inputted; $1-w_b(s,s_1,s_2)$ is the weight of the corresponding point $s_2$; $r(s_1,s_2)$ is the distance between any two pixels $s_1$ and $s_2$; $s_t$ is the first centroid 112a; s and b are any pixels in area B; $s_b^*$ is the location giving the theoretical value of a first minimum pixel intensity error to the plurality of pixels in the first image block 101.

The vector lookup module 13 is coupled to the providing module 11 and the location lookup module 12, for finding a second motion vector 131 which gives the actual value of a minimum pixel intensity error to the plurality of pixels in the first image block 101 according to first centroid 112a, first motion vector 112b, location 121, first weight 122 and second weight 123, and the following condition is satisfied:

$$v_b^* = \mathrm{argmin}_{v_b} \sum_{s \in B} (I_k(s) - (1 - w_b(s, s_b^*, s_t))I_{k-1}(s + v_t) - w_b(s, s_b^*, s_t)I_{k-1}(s + v_b))^2$$

Wherein, s is any pixel; $I_k(s)$ is the intensity value of any pixel; B is the block motion compensation prediction portion 101; $I_{k-1}(s+vt)$ and $I_{k-1}(s+vb)$ the intensity value of a previous frame of any pixel plus a displacement; $v_b^*$ is the motion vector of the location having the minimum pixel intensity error in the template matching prediction portion; and $w_b(s)$ is the weight of the second motion vector $v_b$ 221 corresponding to any pixel.

The processing module 14 is coupled to the providing module 11, the location lookup module 12 and the vector lookup module 13, which can be computing integrated circuits processing integrated circuits or application specific integrated circuits, and the present invention is not limited to such arrangements only. The processing module 13 is capable of sequentially calculating a predictive intensity value 141 of each of the pixels according to the first motion vector 112, the second motion vector 131, the first weight 122 and the second weight 123.

Figure 2:
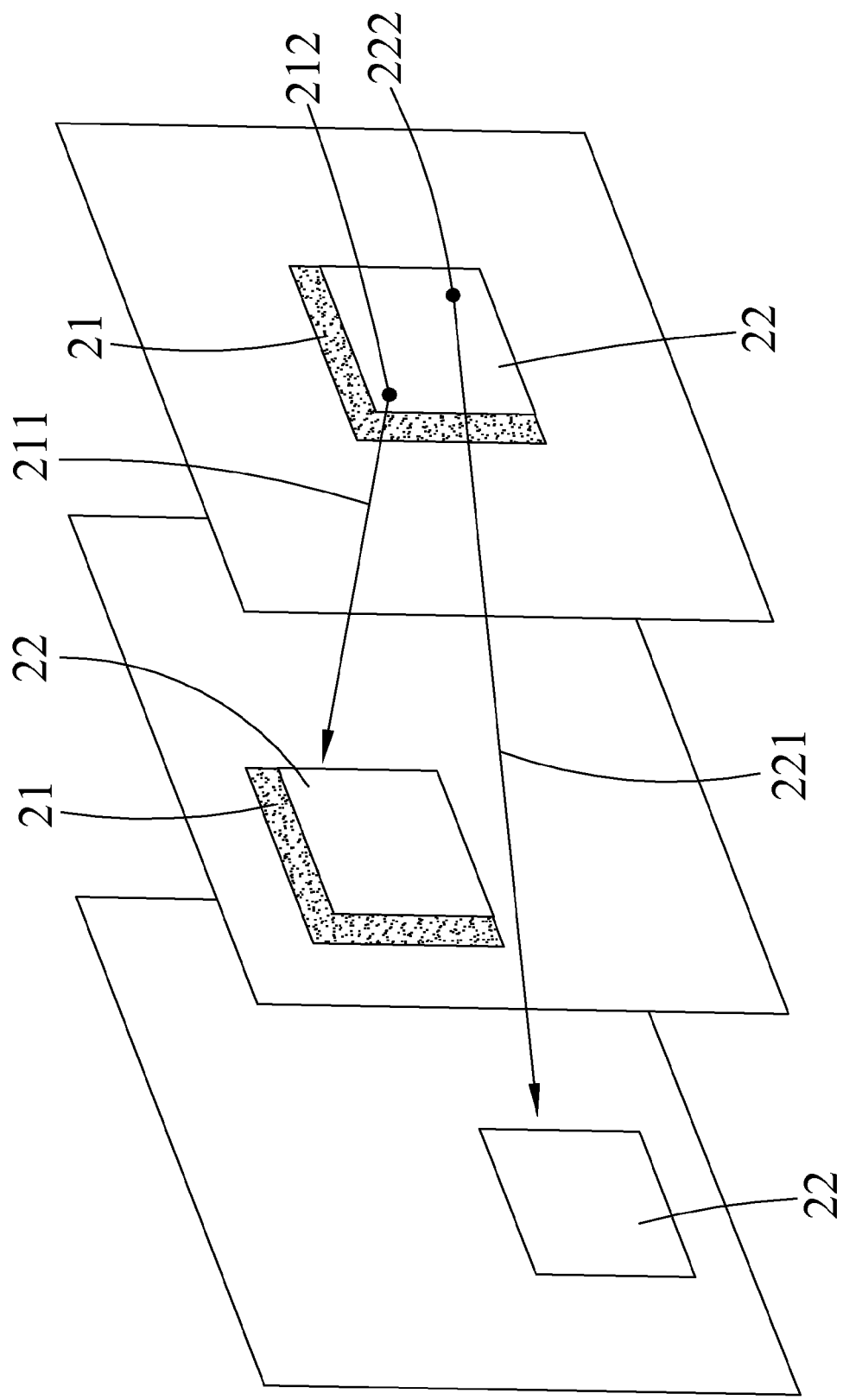
FIG. 2 is a schematic view of a frame prediction system in accordance with a preferred embodiment of the present invention.

With reference to FIG. 2 for a schematic view of a frame prediction system in accordance with a preferred embodiment of the present invention, the processing module of the frame prediction system 1 can use the parametric overlapped block motion compensation (POBMC) method to reference a motion vector or any irregular sample block to further create a predictive intensity value. In this preferred embodiment, the frame prediction system 1 combines the template matching prediction (TMP) portion 21 and the block motion compensated prediction (BMC) portion 22 for generating a first weight corresponding to the second motion vector $v_b$ 221 and a second weight corresponding to the first motion vector $v_t$ 211 according to the second motion vector $v_b$ 221 of the block motion compensated prediction portion 22 (which can be the first image block 101 of the previous preferred embodiment), and the first motion vector $v_t$ 211 of the template matching prediction portion 21 (which can be the second image block 111 of the previous preferred embodiment). Since the first motion vector $v_t$ 211 of the template matching prediction portion 21 is calculated and obtained at the decoding end therefore the dual vector prediction technology simply requires transmitting the second motion vector $v_b$ 221 of the block motion compensated prediction portion 22. Based on the second motion vector $v_b$ 221 and the first motion vector $v_t$ 211, the parametric overlapped block motion compensation (POBMC) method can be used for generating a more accurate predictive intensity value (not shown in the figure) for each of the pixels.

Based on the first motion vector $v_t$ 211, according to first centroid 212, location 222, first weight 122 and second weight 123, the actual value of a second motion vector 131 giving a minimum pixel intensity error to the plurality of pixels in the first image block 101 can be found, and the parametric overlapped block motion compensation (POBMC) method can be used for generating the predictive intensity value for each of the pixels, and the following condition is satisfied:

$$v_b^* = \underset{v_b}{\operatorname{argmin}} \sum_{s \in B} (I_k(s) - (1 - w_b(s, s_b^*, s_t))I_{k-1}(s + v_t) - w_b(s, s_b^*, s_t)I_{k-1}(s + v_b))^2$$

Wherein, s is any pixel; $I_k(s)$ is the intensity value of any pixel; B is the block motion compensation prediction portion 101; $I_{k-1}(s+vt)$ and $I_{k-1}(s+vb)$ the intensity value of a previous frame of any pixel plus a displacement; $v_b^*$ is the motion vector of the location having the minimum pixel intensity error in the template matching prediction portion; and $w_b(s)$ is the weight of the second motion vector $v_b$ 221 corresponding to any pixel.

Therefore, an optimal second motion vector $v_b$ 221 is found by the parametric overlapped block motion compensation (POBMC) method, such that $w_b(s)$ can satisfy the foregoing condition. Firstly, the first motion vector $v_t$ 211 can be a vector of a first centroid at the template matching prediction portion 21. The vector of each of the pixels produced in the block motion compensated prediction portion 22 is found, and includes a location with a minimum error. In this preferred embodiment, the template matching prediction portion 21 has a width of 4 pixel, a long side is in an L-shaped with a length of 20 pixels, and the first centroid falls at a first position 212 at the upper left corner of the block motion compensated prediction portion 22a (if the coordinates of a point at the uppermost left corner of the block motion compensated prediction portions 22 are represented by [0, 0], then the first position 212 is represented by [2, 2]).

The block motion compensated prediction portion 22 is in a square shape having a side with a length of 16 pixels, and the location can fall at a second position 222 at the upper right corner of the block motion compensated prediction portions 22a (if the coordinates of a point at the uppermost left corner of the block motion compensated prediction portions 22 are represented by [0, 0], then the second position 222 is represented by [10, 10]). Therefore, a weight $w_b(s)$ can be obtained by an inverse proportion of the square of the distance between any pixel and the first centroid (which refer to the first position 212 having the coordinates of [2, 2] in this preferred embodiment) and an inverse proportion of the square of the distance between the pixel and the location (which refer to the second position 222 having the coordinates of [10,10] in this preferred embodiment to calculate a prediction vector of each of the pixels.

Figure 3:
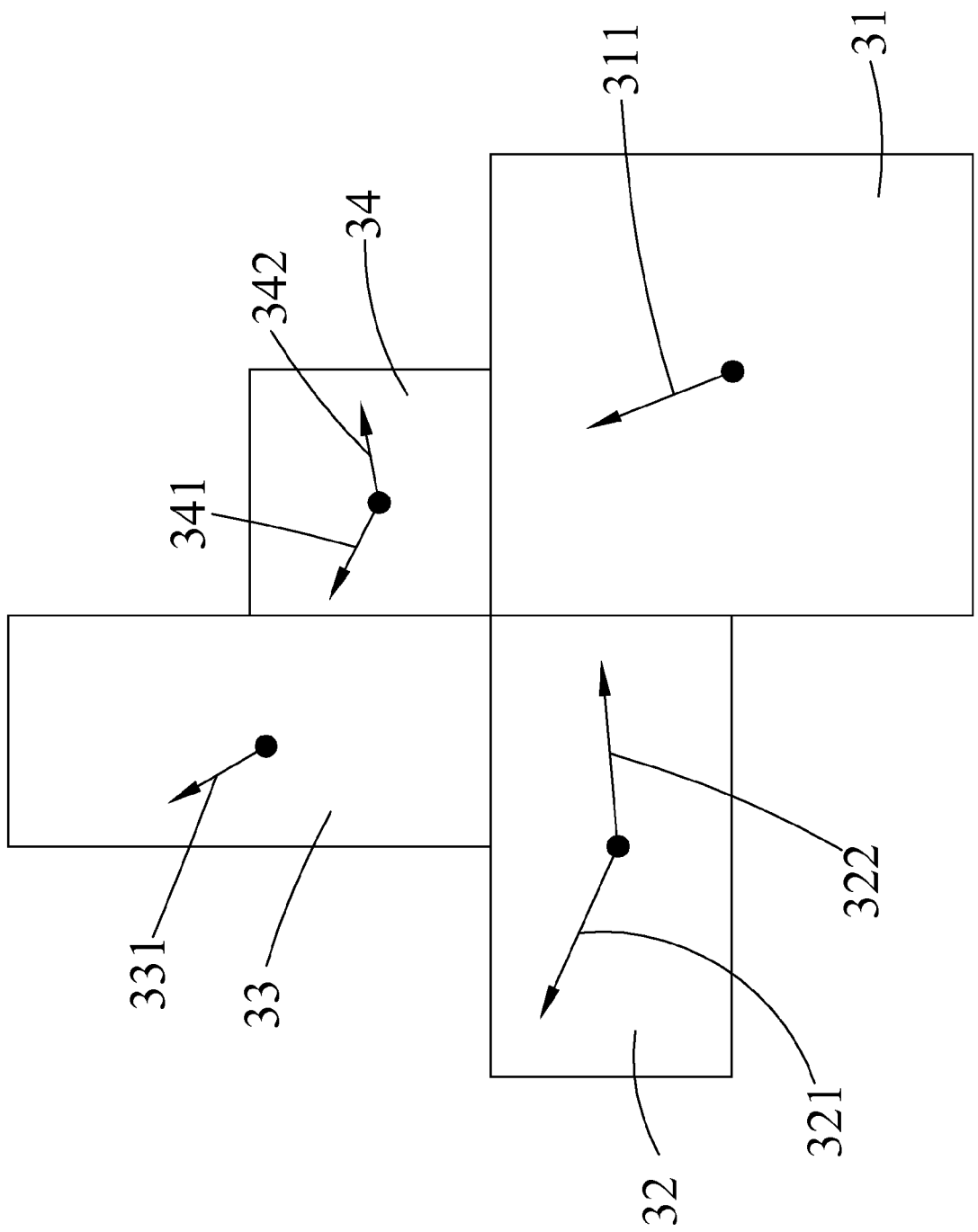
FIG. 3 is a schematic view of a frame prediction system in accordance with another preferred embodiment of the present invention.

With reference to FIG. 3 for a schematic view of a frame prediction system in accordance with another preferred embodiment of the present invention, the frame prediction system 1 further combines a plurality of template matching prediction portions and block motion compensated prediction portions. In other words, according to the second motion vector $v_1$ 311 of the block motion compensated prediction portions 31, the first motion vector $v_2$ 321 and the third motion vector $v_2$' 322 of the first template matching prediction portion 32, the fourth motion vector $v_3$ 331 of the second template matching prediction portion 33 and the fifth motion vector $v_4$ 341 and the sixth motion vector $v_4$' 342 of the third template matching prediction portion 34 to generate each weight for each corresponding motion vector 331, 321, 322, 331, 341, 342. In other words, the parametric overlapped block motion compensation (POBMC) method references a plurality of template matching prediction portions or motion vectors to generate different corresponding weights to sequentially calculate a prediction vector (not shown in the figure) of each of the pixels.

It is noteworthy to point out that people ordinarily skilled in the art should be able to understand that each functional module described above can be combined into an integrated module or decomposed into functional detailed units, depending on the design. In addition, modification or change of the shape and size of the aforementioned template matching prediction portion or block motion compensated prediction portion or the way of using one or more centroids to find the location can be modified or changed, and the embodiments are provided for the purpose of demonstrating the present invention, but not for limiting the scope of the invention.

Even though the concept of the frame prediction method of the frame prediction system has been described in the aforementioned frame prediction system of the present invention, the following flow chart is still used for illustrating the method clearly.

Figure 4:
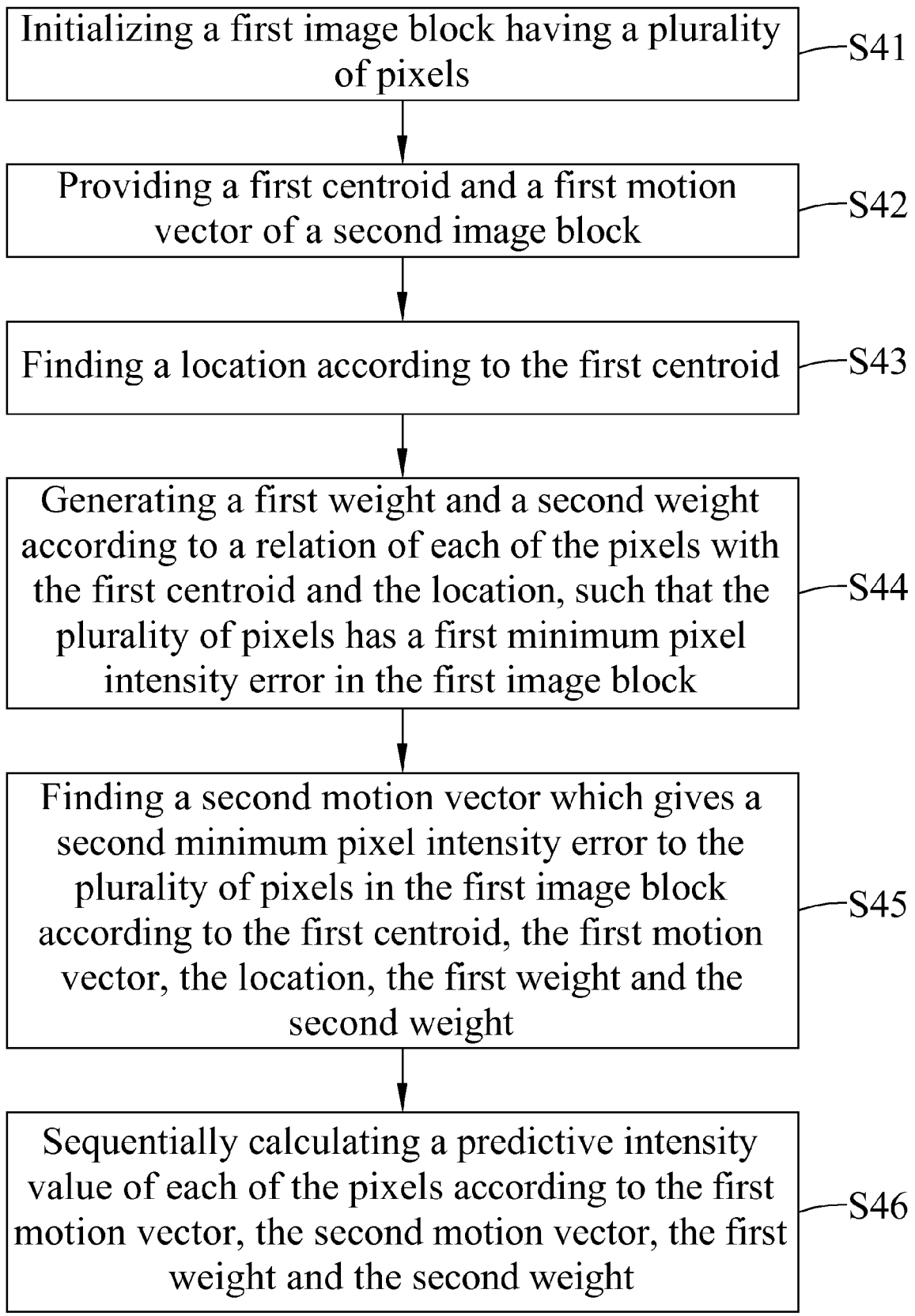
FIG. 4 is a flow chart of a frame prediction method of the present invention.

With reference to FIG. 4 for a flow chart of a frame prediction method of the present, the frame prediction method applicable to a frame prediction system comprising an initializing module, a providing module, a location lookup module and a processing module. The frame prediction method comprises the steps of:

S41: initializing a first image block having a plurality of pixels;

S42: providing a first centroid and a first motion vector of a second image block;

S43: finding a location according to the first centroid;

S44: generating a first weight and a second weight according to a relation of each of the pixels with the first centroid and the location, such that the plurality of pixels has a first minimum pixel intensity error in the first image block;

S45: finding a second motion vector which gives a second minimum pixel intensity error to the plurality of pixels in the first image block according to the first centroid, the first motion vector, the location, the first weight and the second weight; and S46: sequentially calculating a predictive intensity value of each of the pixels according to the first motion vector, the second motion vector, the first weight and the second weight.

The implementation of the frame prediction method for the frame prediction system of the present invention has been described above, and thus will not be described here again.

In summation of the description above, the frame prediction system and frame prediction method of the present invention simply requires the position of the pixel to be predicted and the position of the block centroid of the motion vector to calculate the best weight. Therefore, the present invention can be combined with a prediction method for any irregular shaped motion vectors. In the meantime, the present invention can use the predicted value produced by combining the template matching and the conventional block matching to obtain the efficiency equal to the multi-hypothesis, but it just requires the bits for transmitting the motion vector produced by the conventional block matching, and the prediction method can set the matching criterion used for the block matching again to obtain a better prediction effect.

While particular embodiments of the present invention have been shown and described, it will be obvious to those skilled in the art that, based upon the teachings herein, changes and modifications may be made without departing from this invention and its broader aspects. Therefore, the appended claims are intended to encompass within their scope of all such changes and modifications as are within the true spirit and scope of the exemplary embodiments of the present invention.

What is claimed is:

1. A frame prediction system, comprising: an initializing module initializing a first image block, and the first image block having a plurality of pixels;
   a providing module providing a thirst centroid and a first motion vector of a second image block;
   a location lookup module coupled to the initializing module and the providing module for finding a location according to the first centroid, and generating a first weight and a second weight according to a relation of each of the pixels with the first centroid and the location, such that the plurality of pixels has a first minimum pixel intensity error in the first image block, wherein the location lookup module generates the first weight and the second weight inversely proportional to the square of the distance between any pixel and the first centroid, and inversely proportional to the square of the distance between the pixel and the location;
   a vector lookup module coupled to the providing module and the location lookup module for finding a second motion vector which gives a second minimum pixel intensity error to the plurality of pixels in the first image block according to the first centroid, the first motion vector, the location, the first weight and the Second weight; and
   a processing module coupled to the providing module, the location lookup module and the vector lookup module for sequentially calculating a predictive intensity value of each of the pixels according to the first motion vector, the second motion vector, the first weight and the second weight.

2. The frame prediction system of claim 1, wherein the processing module linearly combines the first motion vector, the second motion vector, the first weight and the second weight to calculate the predictive intensity value of each of the pixels.

3. The frame prediction system of claim 1, wherein the providing module further provides a second centroid and a third motion vector of a third image block.

4. The frame prediction system of claim 3, wherein the location lookup module finds the location according to the first centroid and the second centroid and generates the first weight, the second weight and the third weight according to a relation of each of the pixels to the first centroid, the second centroid and the location, such that the plurality of pixels have the first minimum pixel intensity error in the first image block.

5. The frame prediction system of claim 4, wherein the vector lookup module finds the second motion vector which gives the second minimum pixel intensity error to the plurality of pixels in the first image block according to the first centroid, the second centroid, the first motion vector, the third motion vector, the location, the first weight, second weight and the third weight.

6. The frame prediction system of claim 5, wherein the processing module sequentially calculates the predictive intensity value of each of the pixels according to the first motion vector, the third motion vector, the second motion vector, the first weight, the second weight and the third weight.

7. The frame prediction system of claim 3, wherein the providing module further provides a fourth motion vector of the third image block.

8. The frame prediction system of claim 7, wherein the vector lookup module finds the second motion vector which gives the second minimum pixel intensity error to the plurality of pixels in the first image block according to the first centroid, the second centroid, the first motion vector, the third motion vector, the fourth motion vector, the location, the first weight, the second weight and the third weight.

9. The frame prediction system of claim 8, wherein the processing module sequentially, calculates the predictive intensity value of each of the pixels according to the first motion vector, the third motion vector, the fourth motion vector, the second motion vector, the first weight, the second weight and the third weight.

10. A frame prediction method, comprising the steps of:
    initializing a first image block having a plurality of pixels;
    providing a first centroid and a first motion vector of a second image block; finding a location according to the first centroid;
    generating a first weight and a second weight according to a relation of each of the pixels with the first centroid and the location, such that the plurality of pixels has a first minimum pixel intensity error in the first image block;
    generating the first weight and the second weight according to an inverse proportion of the square of the distance between any pixel and the first centroid and an inverse proportion of the square of the distance between the pixel and the location;
    finding a second motion vector which gives a second minimum pixel intensity error to the plurality of pixels in the first image block according to the first centroid, the first motion vector, the location, the first weight and the second weight: and sequentially calculating a predictive intensity value of each of the pixels according to the first motion vector, the second motion vector, the first weight and the second weight.

11. The frame prediction method of claim 10, further comprising a step of linearly combining the first motion vector, the second motion vector, the first weight and the second weight to calculate the predictive intensity value of each of the pixels.

12. The frame prediction method of claim 10, further comprising a step of providing a second centroid and a third motion vector of a third image block.

13. The frame prediction method of claim 12, further comprising steps of finding the location according to the first centroid and the second centroid; and generating the first weight, the second weight and the third weight according to a relation of each of the pixels with the first centroid, the second centroid and the location, such that the plurality of pixels have the first minimum pixel intensity error in the first image block.

14. The frame prediction method of claim 13, further comprising a step of finding the second motion vector which gives the second minimum pixel intensity error to the plurality of pixels in the first image block according to the first centroid, the second centroid, the first motion vector, the third motion vector, the location, the first weight, the second weight and the third weight.

15. The frame prediction method of claim 14, further comprising a step of sequentially calculating the predictive intensity value of each of the pixels according to the first motion vector, the third motion vector, the second motion vector, the first weight, the second weight and the third weight.

16. The frame prediction method of claim 12, further comprises a step of providing a fourth motion vector of the third image block.

17. The frame prediction method of claim 16, further comprising a step of finding the plurality of pixels having the second minimum pixel intensity error of the second motion vector in the first image block according to the first centroid, the second centroid, the first motion vector, the third motion vector, the fourth motion vector, the location, the first weight, the second weight and the third weight.

18. The frame prediction method of claim 17, further comprising a step of sequentially calculating the predictive intensity value of each of the pixels according to the first motion vector, the third motion vector, the fourth motion vector, the second motion vector, the first 25 weight the second weight and the third weight.

* * * * *